United States Patent [19]

Symonds

[11] Patent Number: 5,610,451
[45] Date of Patent: Mar. 11, 1997

[54] UNINTERRUPTIBLE POWER SUPPLY WITH POWER FACTOR CORRECTION

[75] Inventor: Neil S. Symonds, Agoura, Calif.

[73] Assignee: Magnum Power PLC, Livingston, Scotland

[21] Appl. No.: 565,726

[22] Filed: Nov. 30, 1995

[51] Int. Cl.⁶ ..................................................... H02J 7/00
[52] U.S. Cl. .................. 307/66; 307/64; 307/65; 307/85; 307/86; 307/87; 363/34; 363/37; 364/492; 323/259; 323/344
[58] Field of Search .................................. 307/66, 64, 65, 307/87, 86, 85; 363/34, 37; 364/492; 323/259, 344

[56] References Cited

U.S. PATENT DOCUMENTS

| | | | |
|---|---|---|---|
| 4,745,299 | 5/1988 | Eng et al. | 307/66 |
| 5,146,396 | 9/1992 | Eng et al. | 363/16 |
| 5,184,025 | 2/1993 | McCurry et al. | 307/66 |
| 5,289,045 | 2/1994 | Lavin et al. | 307/64 |
| 5,424,936 | 6/1995 | Reddy | 363/34 |
| 5,465,011 | 11/1995 | Miller et al. | 307/64 |
| 5,481,449 | 1/1996 | Kheraluwala et al. | 363/17 |
| 5,515,261 | 5/1996 | Bogdan | 363/89 |

OTHER PUBLICATIONS

Micro Linear Data Sheet for ML4824–Power Factor and PWM Combo Sep. 1 1994.
Texas Instrument Data Sheet for TL431–Adjustable Precision Shunt Regulators Aug. 1, 1988.

Primary Examiner—William M. Shoop, Jr.
Assistant Examiner—Albert W. Paladini
Attorney, Agent, or Firm—Gregory L. Roth

[57] ABSTRACT

An energy efficient uninterruptible regulated power supply includes a full wave rectifier that is responsive to AC main power generating an unregulated DC voltage signal, a power factor correcting boost converter coupled to receive and selectively increase the unregulated voltage signal to generate a boosted voltage signal, a battery and a single ended forward converter having a primary winding coupled to receive pulse width modulated energy from the boosted voltage signal and a secondary winding couple bidirectionally to the battery with pulse width modulated control. A first controller pulse width modulates the boosted voltage and battery signals coupled to the primary and secondary windings, respectively, to regulate the output voltage while a second controller operates independently of the first controller pulse width modulate the boost converter to regulate the voltage of a transformer secondary signal that is coupled to the battery.

20 Claims, 2 Drawing Sheets

UNINTERRUPTIBLE POWER SUPPLY WITH POWER FACTOR CORRECTION

BACKGROUND OF THE INVENTION

Uninterruptible power supplies contain a battery or other power source that enables the power supply to continue to supply energy after main power has been lost. Uninterruptible power supplies are frequently used to supply power to electronic equipment such communications equipment or computers that operate in an environment wherein a sudden loss of power is not acceptable. Depending upon the power consumption of the operating equipment and the capacity of the auxiliary power source, the auxiliary power source may be called upon to supply auxiliary power for only a few minutes while data is saved and an orderly shutdown is executed or for the duration of a power failure, that could last for hours or even days.

Technological improvements that have been achieved in recent years have enabled uninterruptible power supplies to be manufactured with increased reliability and reduced cost. This has increased the number of applications in which uninterruptible power supplies can be economically employed, thereby further increasing the demand for such power supplies. This increased demand makes further improvements in reliability and efficiency as well as reductions in cost even more important.

For safety reasons, power supplies are required to isolate the high voltage power input side of a power supply from the lower voltage output side. The auxiliary power supply is typically a low voltage battery of about 12 to 24 volts and therefor is usually connected to the low voltage side of the power supply. The battery must be isolated from the secondary windings to prevent overcharging the battery and to prevent drawing power from the battery when main power is present. In one arrangement shown in U.S. Pat. No. 5,289,045 to Lavin et al., isolation is achieved by enabling the power switch for auxiliary current to operate only when a loss of main power is detected. Extra circuitry is thus required to detect the power loss and selectively enable power switch operation.

Other arrangements place an isolation diode between the auxiliary battery and the secondary winding. As long as main power is present the diode remains reverse biased and the battery is protected. When main power is lost the voltage at the secondary winding drops below the battery voltage and the battery begins to supply current to the secondary winding through the diode. While the diode isolation avoids the need for power loss detection circuitry, it has certain disadvantages. The diode must carry a large current with a minimum voltage drop and is relatively expensive. The 0.6 volt drop across a diode represents a significant 5% power efficiency loss for a 12 volt battery. This power loss not only reduces the auxiliary backup time in the event of a loss of main power, but also increases the heat dissipation load on both the power supply and the equipment in which the power supply is installed. A relatively expensive, high current voltage regulator is required to charge and maintain the battery regardless of which type of isolation is used.

A need thus exists to improve both the cost and efficiency of uninterruptible power supplies. By regulating the voltage on the secondary winding in accordance with the present invention, the need for both the battery isolation circuit component and the separate battery charging circuit is eliminated.

SUMMARY OF THE INVENTION

A high efficiency uninterruptible power supply in accordance with the invention provides a continuous seamless switch over between utility supplied main power and auxiliary power operation with no power consuming diode in the current path between the auxiliary power source and the power converter. The conventional, power consuming isolation diode on the secondary side of the converter circuit is eliminated by providing dual pulse width modulation control on the primary side of the converter. A pulse width modulated boost converter maintains a boost voltage that is applied to a primary winding of the converter power transformer at a voltage that is reflected through the turns ratio of the transformer as a secondary voltage that is precisely maintained at a charge maintenance float voltage required for a battery providing the auxiliary power supply. Concurrently, an output voltage controller pulse width modulates the current supplied to the primary side of the converter transformer to regulate the voltage of the power supply output signal by controlling the active portion of the pulse width modulation duty cycle.

The power supply includes a converter circuit having a transformer with a primary winding and at least one secondary winding, a dual control main power source coupled to provide main power to the primary winding and an auxiliary power source coupled to supply auxiliary power to the secondary winding. A primary power switch is coupled in series with the primary winding and the controlled main DC power source while an auxiliary power switch is coupled between the auxiliary power source and the secondary winding.

The main power source includes an output voltage controller which provides synchronous pulse width modulation duty cycle control over the two power switches to regulate the voltage of the output power signal. The main power source also includes a full wave rectifier coupled to generate a full wave rectified voltage signal in response to utility main power and a boost converter coupled to boost the voltage of the rectified voltage signal and generate a boost voltage signal that is applied to the primary winding and pulse width modulation controlled to maintain the active voltage at the secondary winding at the float voltage of the auxiliary power supply. The boost converter provides power factor correction by assuring that power is drawn from the main power source throughout each cycle of the main power signal and not just from the two voltage peaks that are generated by full wave rectification of each cycle of the AC main power. As long as main power is available the main power source supplies substantially all of the required power and during the active portion of the duty cycle the secondary winding supplies the auxiliary power supply with a charging current that maintains the float voltage, which may be 13.6 volts for a 12 volt battery.

If the main power supply is lost, the boost converter will be unable to maintain the boost voltage at a value sufficient to charge the auxiliary power supply through the secondary winding and the auxiliary power supply will begin to discharge as it supplies current to the secondary winding. Since the primary and auxiliary power switches are operated synchronously together at all times, the transition from main power to auxiliary power is transparent to the continuously maintained regulated output signal. During the transition the voltage at the secondary winding drops from the 13.6 battery float voltage maintained by the main power supply to the 12 volt battery supply voltage. However, this drop occurs over many cycles of the 100 kHz pulse width modulation control frequency and is compensated by increasing the active portion of the duty cycle of the primary and auxiliary power switches.

The converter circuit includes a low pass filter coupled between the secondary winding and the output signal that removes the modulation control frequency from the output signal. The power supply also includes an auxiliary current feedback circuit and two auxiliary voltage feedback circuits. The auxiliary current feedback circuit generates a current sense charging current signal that is fed back to the boost converter to reduce the boost voltage signal in the event the charging current reaches a magnitude that could damage the auxiliary battery. The auxiliary current feedback circuit also generates a current sense discharge current signal that is fed back to a current limiting circuit of the output voltage controller. During auxiliary power operation the discharge current signal is used to limit the current that can be supplied by the regulated output signal. During main power operation the discharge current signal subtracts an indication of the charging current from a main power current feedback signal so that the maximum current available at the regulated output signal is not reduced by charging current supplied to the auxiliary power source.

An auxiliary voltage feedback circuit generates an auxiliary voltage feedback signal that is used by the boost converter to maintain the boost voltage signal at a voltage that will provide the desired float voltage at the secondary winding during the active portion of a duty cycle. An output voltage feedback circuit generates a regulated output voltage feedback signal that is used by an output controller to regulate the voltage of the output voltage signal. The output voltage signal is maintained at +5 volts in this example.

BRIEF DESCRIPTION OF THE DRAWINGS

A better understanding of the invention may be had from a consideration of the following Detailed Description, taken in conjunction with the accompanying drawings in which.

DETAILED DESCRIPTION OF THE INVENTION

Figure 1:
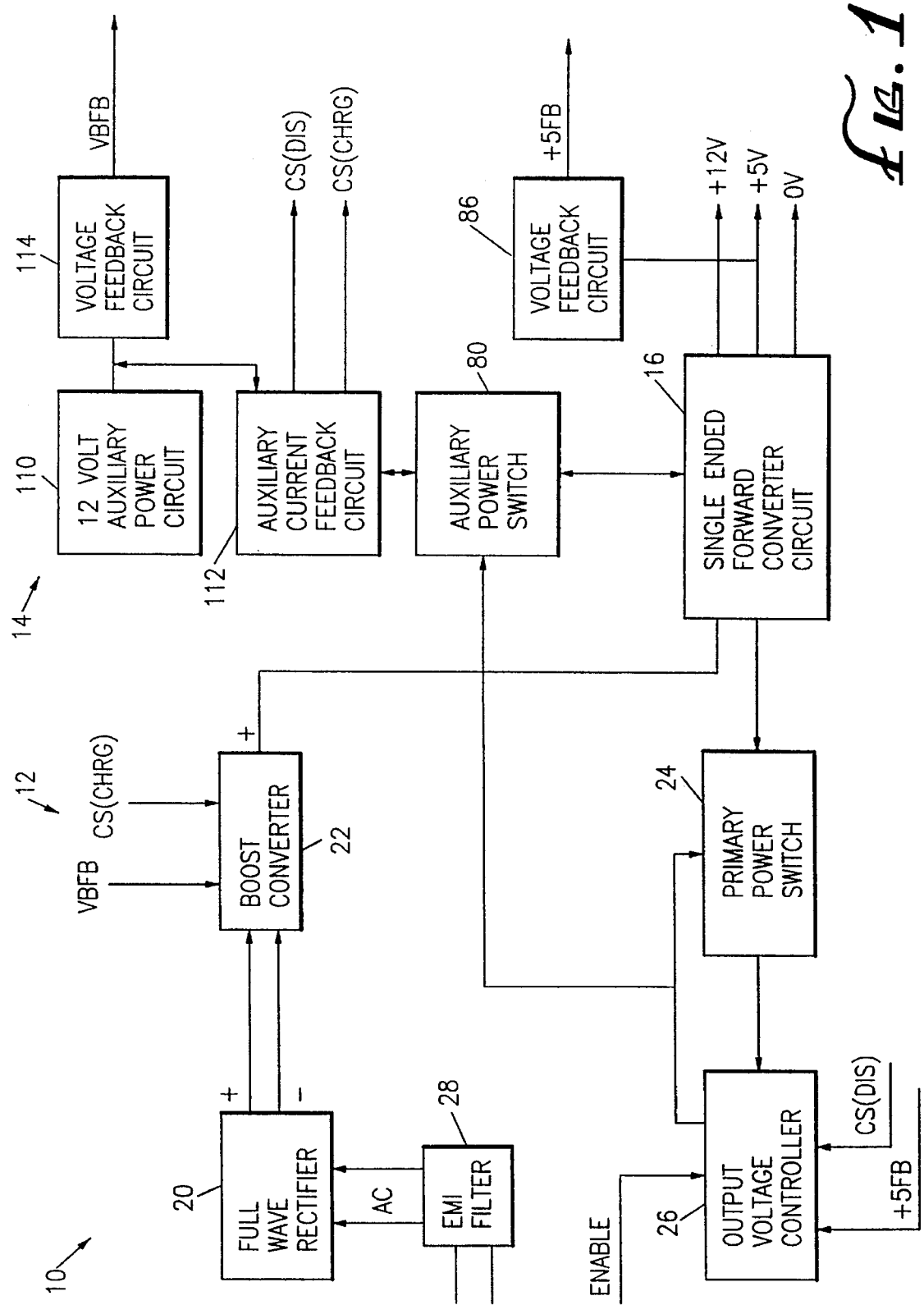
FIG. 1 is a block diagram representation of an uninterruptible power supply using power factor correction to regulate the secondary voltage in accordance with the invention.
Figure 2:
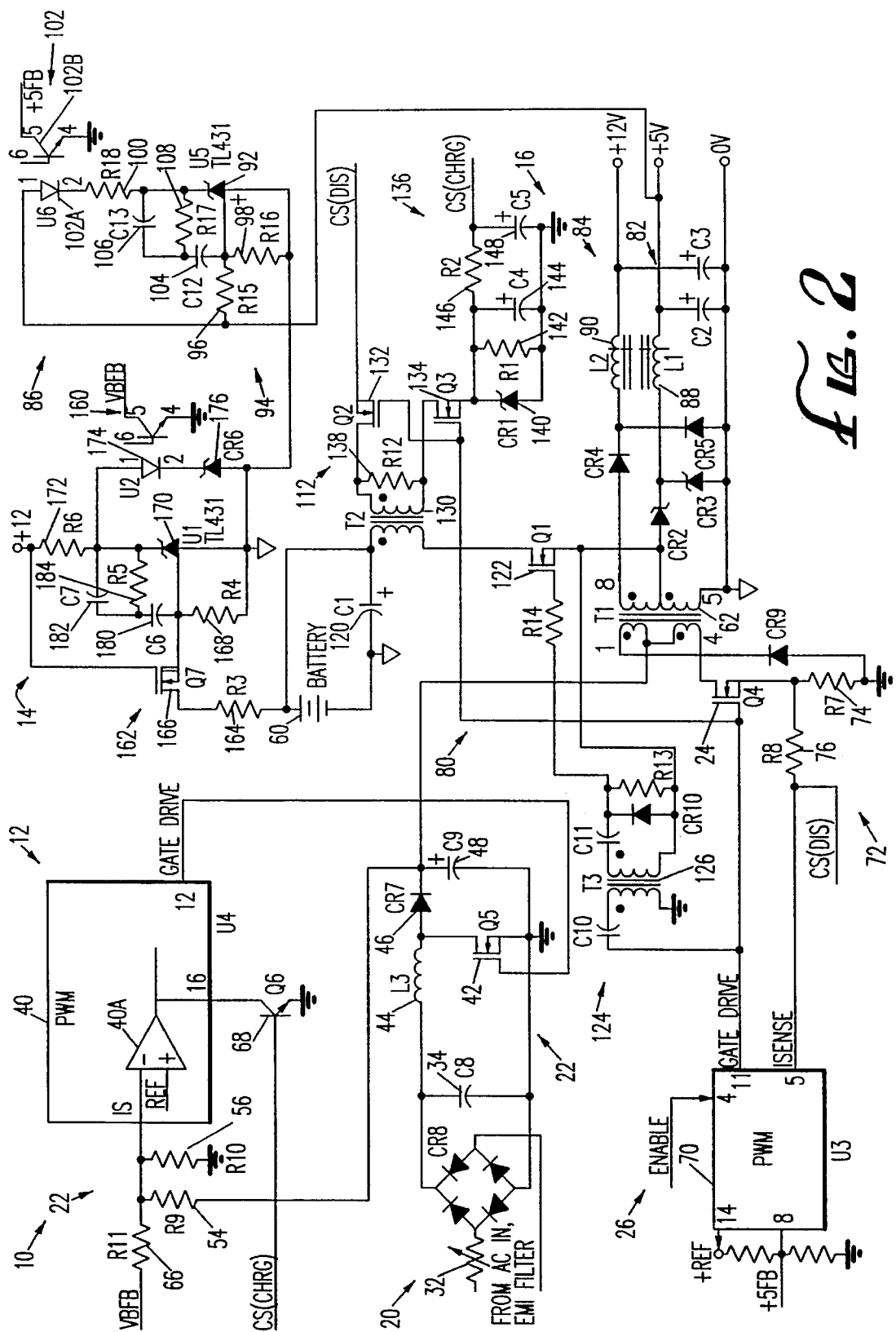
FIG. 2 is a more detailed schematic and block diagram representation of the uninterruptible power supply shown in FIG. 1.

Referring now to FIGS. 1 and 2, an uninterruptible power supply with power factor correction 10 in accordance with the invention includes a dual control main power controller 12, a secondary control circuit 14 and a single ended forward converter circuit 16 coupled to receive main power from the main power controller, auxiliary power from the secondary control circuit and generate regulated output voltage signals which are designated +5 V and +12 V. While main power is present, main power controller 12 controls the voltage of a boost voltage signal applied to the primary of converter circuit 16 to maintain a secondary voltage of converter circuit 16 at a voltage that is appropriate for the auxiliary power supply. Main power controller 12 independently controls the active portion of the power duty cycle to regulate the output voltage of the output voltage signals +5 V and +12 V.

The main power controller 12 includes at a full wave rectifier 20, a boost converter 22, a primary power switch 24, an output voltage controller 26 and an EMI filter 28. The conventional full wave rectifier 20 receives main AC power through an EMI filter 28. The preferred embodiment of the power supply 10 does not use a main AC input power switch, although a switch would be included for many applications.

In the preferred embodiment the front end is under constant power and the output voltage controller 26 is enabled by a logic control signal, ENABLE. Rectifier 20 includes a thermistor 32, an EMI filter capacitor 34 and a diode bridge rectifier 36 that is coupled to receive AC current through thermistor 32 and generate a full wave rectified voltage signal that is coupled to boost converter 22. During normal main power operation thermistor 32 is heated by the $I^2R$ loss of the current flowing therethrough and the resistance of thermistor 32 is relatively low. Upon loss of AC main power the thermistor 32 cools and the resistance increases while the DC voltage held by a storage capacitor 48 within boost converter 22 decreases. Upon the return of AC main power, the increased resistance of thermistor 32 limits the sudden surge of current as storage capacitor 48 within boost converter 22 is recharged to the peak of the AC main voltage sine wave. However, thermistor 32 is quickly reheated by the flow of current and normal operation is restored.

Boost converter 22 includes a pulse width modulation (PWM) controller 40 coupled to control a MOS-FET boost transistor switch 42. Boost converter 22 also includes an inductor 44, a diode 46 and a large storage capacitor 48 serially connected in the stated order between the full wave rectified voltage signal and ground. Boost switch 42 has a first power terminal connected to the conductor path between inductor 44 and diode 46 and a second terminal connected to ground. Upon the closure of boost switch 42 inductor 44 is effectively shorted to ground and the current flow through inductor 44 increases. When switch 42 is opened the energy storage of inductor 44 causes current to continue to flow and charge capacitor 48. The current flow through inductor 44, and hence the voltage on capacitor 48, thus increases with the active portion of the PWM duty cycle during which boost switch 42 is closed.

Controller 40 may be a power factor portion of an ML 4824 Power Factor and PWM Combo which is available from Micro Linear or a functionally equivalent duty cycle controller and is shown schematically in FIG. 2 as including an operational amplifier 40A comparing an input signal to a reference voltage to produce an error signal which is selectively reduced in amplitude by transistor 50 in response to a current sense charge signal, cs(CHRG). A voltage divider 52 having resistors 54 and 56 is coupled between the boost voltage signal at the output of capacitor 48 and ground. PWM controller 40 operates to maintain the boost voltage signal at a regulated magnitude by controlling the active portion of the duty cycle for transistor switch 42 in response to the voltage appearing at the center of voltage divider 52.

In a typical application the maximum expected AC line voltage is 264 VRMS, which has a peak voltage of 373 volts. Allowing for voltage drops through the rectifying diodes, the maximum expected magnitude of the rectified voltage signal is then 370 volts. The minimum design magnitude of the boost voltage signal should then be equal to or greater than the maximum expected rectified voltage signal of 370 volts and the minimum voltage has been selected to be 370 volts for the preferred embodiment shown in FIGS. 1 and 2.

In the present example, auxiliary power is provided by a 12 volt lead acid battery 60 and a power transformer 62 within converter circuit 16 provides the primary to secondary voltage transformation. The maximum charging current that will not damage battery 60 is 1.5 amps and under worst case conditions this occurs at a battery voltage of 12 volts. That is, at 12 volts the charging current will not exceed the allowable 1.5 amps. The turns ratio between the power primary winding and 5 volt secondary winding of power transformer 62 should therefor be nominally selected to be 370/12=30.83:1. This ratio assures that the battery charging current can be adequately limited when the boost voltage signal across capacitor 48 is at the worst case minimum value.

The maximum voltage required at the 5 volt secondary winding of transformer 62 is the 13.6 volt float voltage of battery 60. Given the previously selected turns ratio, this corresponds to a maximum boost voltage signal of 419 volts at the power primary winding of transformer 62. In the present example the values of resistors 54, 56 of voltage divider 52 are selected to maintain the boost voltage signal at a nominal intermediate value of 400 volts.

A voltage feedback signal VBFB is also connected to the center of voltage divider 52 through a feedback resistor 66. As described in greater detail hereafter, feedback signal VBFB draws current to ground when the battery voltage is less than the desired float voltage of 13.6 volts. This connection through resistor 66 reduces the voltage at the input to PWM converter 40 and causes converter 40 to increase the active portion of the PWM duty cycle and thereby increase the magnitude of the boost voltage signal and hence the battery voltage generated by the 5 volt secondary winding of transformer 62. The value of resistor 66 should therefore be selected to achieve a boost voltage of at least 419 volts when taking into account worst case operating conditions and efficiency losses.

Thus, under normal operating conditions, PWM converter 40 operates to maintain the boost voltage signal at a nominal value of 419 volts that will maintain a float voltage of 13.6 volts at battery 60. However, PWM converter 40 further has a current sense input which receives a current sense charge signal, cs(CHRG), which increases in proportion to the charging current of battery 60 as described in greater detail hereafter. The charging current feedback signal is shown schematically to be coupled to the base input of an NPN transistor 68 having its emitter connected to ground and its collector connected to the output of an operational amplifier 40A that is internal to the PWM controller 40. Current feedback signal cs(CHRG) is calibrated to reach a magnitude equal to the 0.6 volt base-emitter voltage of transistor 68 when the battery charging current reaches the maximum allowable magnitude of 1.5 amps. This maximum allowable current might occur upon restoration of main power following a power outage during which battery 60 supplies auxiliary power and becomes significantly discharged.

As the charging current rises above 1.5 amps, current feedback signal cs(CHRG) turns on transistor 68, which pulls down the output of the internal operational amplifier 40A to thereby reduce the active portion of the commanded duty cycle and correspondingly the boost voltage signal and the voltage at the 5 volt secondary winding of transformer 62. This current limited operation will continue until battery 60 becomes sufficiently charged that the 13.6 volt float voltage does not result in excessive charging current.

The output voltage controller includes an ML 4824 PWM controller 70, which may be a second PWM controller contained in the same package as controller 40, and a current sensing circuit 72 having a primary current sense resistor 74 and a summing resistor 76. During both main power and auxiliary power operation, PWM controller 70 receives the auxiliary feedback signal, +5FB, as a feed back signal and controls the active portion of the PWM duty cycle of primary power switch 24 and an auxiliary power switch 80 to maintain the 5 volt regulated output signal at 5 volts.

The power supply 10 provides a series conductive current path from the boost voltage signal generated by boost converter 22 through the power primary winding of power transformer 62, primary power switch 24 and current sense resistor 74. During normal main power operation battery 60 receives a small trickle current and the effect of current feedback signal cs(DIS) is not significant. Current sense resistor 74 has a value selected to produce a voltage of 1.0 volts when the primary current is sufficient to produce the maximum rated power output of the power supply 10. The voltage across resistor 74 is fed back to the PWM controller 70 where it provides current mode control of the active duty cycle portion of the power switches 24 and 122. If the load on the power supply is increased such that the voltage across resistor 74 exceeds 1.0 volts, a comparator internal to PWM controller 70 terminates the active portion of the duty cycle to prevent any further increase in the switch current. PWM controller 70 thus drives the primary power switch 24 and the auxiliary power switch 80 with an active duty cycle portion that maintains the 5 volt regulated output signal at 5 volts, but reduces this voltage as necessary to prevent the power supply 10 from generating more than the maximum rated output power. The effect of the current sense discharge signal, cs(DIS), will be explained hereafter.

In addition to the primary power winding, power transformer 62 has a primary flux return winding having one terminal connected to the boost voltage signal and the other terminal connected through a diode to ground. Transformer 62 also has a second, 12 volt output secondary winding that does not contribute to the feedback control of converter 70.

In addition to transformer 62, single ended converter circuit 16 includes a 5 volt low pass filter 82, and a 12 volt low pass filter 84. An output signal voltage feedback circuit 86 generates the output voltage feedback signal, +5FB. The 5 volt low pass filter is coupled between the 5 volt secondary winding of transformer 62 and the 5 volt regulated output signal. A 12 volt low pass filter 84 is coupled between the 12 volt secondary winding of transformer 62 and the 12 volt output signal. Filters 82, 84 each have a series coupled inductor, inductor 88 and inductor 90, respectively, which are conventionally wound onto a common magnetic core so that they can compensate for any relative voltage imbalances between the two secondary output signals.

The output signal voltage feedback circuit 86 includes an operational amplifier 92 with an internal voltage reference which may be a TL431 integrated circuit that is available from Texas Instruments. The noninverting input of operational amplifier 92 is connected to the center of a voltage divider 94 having resistors 96 and 98 connected in series between the regulated 5 volt output signal and ground. The inverting input is connected to ground and generates an internal reference that is matched by the center of the voltage divider 94 when the 5 volt output signal is at 5 volts. The open collector output of operational amplifier 92 is connected in series through a current limiting resistor 100 and a light emitting diode of an opto coupler 102 to the regulated 5 volt output signal. When the regulated output voltage signal is above 5 volts, operational amplifier 92 is turned on, driving the output low and causing it to draw current through the light emitting diode 102A of opto coupler 102. The light emitting diode thus turns on, causing the photosensitive transistor 102B of the opto coupler 102 to begin conducting.

The open collector of photosensitive transistor 102B is connected to the voltage control input of PWM controller 70 as feedback signal +5FB and pulls this input toward ground as long as the output voltage is above 5 volts. PWM controller 70 responds to this voltage feedback input, +5FB, by decreasing the active portion of the duty cycle until an equilibrium point is reached where the output of operational amplifier 92 rises, thus tending to turn off LED 102A and transistor 102B to prevent a further decrease in the active portion of the duty cycle and corresponding decreases in the regulated output voltage. Capacitors 104, 106 and resistor 108 tailor the frequency response of operational amplifier 92 to assure stability of the feedback loop. The output voltage signal is thus maintained at 5 volts notwithstanding the voltage at the output of the 5 volt secondary winding of transformer 62, which may vary depending on the charge state of battery 12 and whether operation is under main or auxiliary power.

The secondary control circuit 14 includes a 12 volt auxiliary power circuit 110, an auxiliary current feedback circuit 112 and a voltage feedback circuit 114 and the output voltage feedback circuit 86. The 12 volt auxiliary power circuit 110 has the battery 60 and a filter capacitor 120 connected across the positive and negative power terminals of battery 60.

The auxiliary power switch 80 includes a MOS-FET transistor switch 122 which is coupled through a transformer circuit 124 having an isolation transformer 126 to the gate drive output signal from PWM controller 70. The primary and auxiliary power transistor switches 24, 122 are thus controlled synchronously by essentially the same signal so that they are switched on and off together. During the inactive portion of the duty cycle both switches 132 and 134 are off, thus allowing current sense transformer 130 to recover its flux through resistor 138. The main and auxiliary power sources are thus continuously both connected to supply power to power supply 10 and the auxiliary power circuit 110 seamlessly begins to supply power as soon as the voltage at the 5 volt secondary winding drops below the battery voltage upon the occurrence of a main power failure.

The auxiliary current feedback circuit 112 has an isolation transformer 130 having primary and secondary windings with a turns ratio of 1:50. The primary winding is connected in series with the battery 60 to complete a series current path from the positive terminal of battery 60, through the primary winding of current sense isolation transformer 130 and auxiliary power transistor switch 122 to the 5 volt secondary winding of power transformer 62. While transistor switch 122 is closed during the active portion of each duty cycle, a continuous, bidirectional conductive path thus exists between battery 60 of auxiliary power circuit 110 and the 5 volt secondary winding of transformer 62. In view of the 1:50 turns ratio of transformer 130, the primary winding of transformer 130 presents nearly a short circuit between battery 60 and power switch 122.

Auxiliary current feedback circuit 112 also has a transistor switch 132 connecting one secondary winding terminal to current sense discharge signal, cs(DIS), and a transistor switch 134 connecting the other secondary winding terminal to a low pass filter circuit 136. Switches 132, 134 have their gate terminals connected to the gate drive output of PWM controller 70, causing them to be switched synchronously with power transistor switches 24 and 122. The outputs of switches 132, 134 thus represent the current flow during the active portion of each PWM duty cycle.

When the auxiliary power circuit 110 is discharging, signal cs(DIS) provides a current feedback signal to the current sense input of PWM controller 70. Signal cs(DIS) is a current signal representing the current through the 5 volt secondary winding of transformer 62 and generates the feedback voltage input to PWM controller 70 and the feedback signal flows through resistor 76 and 74 to ground. Resistor 76 operates to increase the voltage of the auxiliary current feedback signal relative to the primary current feedback signal through resistor 74 to compensate for the difference in the turns ratio between power transformer 62 and current sense transformer 130.

When signal cs(DIS) is positive, the primary winding current of transformer 62 is most likely zero and signal cs(DIS) generates the entire current feedback input to PWM controller 70. However, when the auxiliary power circuit is charging, power is being generated in response to the primary winding current passing through current sense resistor 74. Signal cs(DIS) is then a negative current that subtracts from the primary current feedback signal, causing the current limit signal to be generated as the primary current less the charging current. By subtracting the charging current feedback signal from the primary current feedback signal, the charging current does not reduce the current output of power supply 10 below the full rated output.

Switch 134 couples the second terminal of the secondary winding of transformer 130 through filter circuit 136 to the current sense charge feedback signal, cs(CHRG). Signal cs(CHRG) is a voltage signal that is positive when battery 60 is being charged and is proportional to the charging current.

Filter 136 has a Schottky diode 140, a resistor 142 and a capacitor 144 connected in parallel between the output of switch 134 and ground. A resistor 146 couples the output of switch 134 to feedback signal cs(CHRG) and a capacitor 148 extends between signal cs(CHRG) and ground. During steady state main power operation the charge on capacitor 144 is relatively constant and the current through series resistor 146 is negligible. Substantially all of the current from the secondary winding of current feedback transformer 130 passes through burden resistor 142 to generate a voltage signal there across that is proportional to the charging current into battery 60.

During a given switching period the voltage at the secondary winding of power transformer 62 is unlikely to be precisely constant because of various effects, such as, varying resistive drops caused by current ramping up in the output inductor, transformer leakage inductance and droop on capacitor 48 which carries the boost voltage signal. Since the secondary voltage of transformer 62 is coupled effectively directly to capacitor 120, which is connected across battery 60, this varying voltage will cause the current into capacitor 120 to vary and possibly even reverse during a switching cycle since the current is limited only by the parasitic circuit impedances of the power transformer 62 secondary winding, the primary winding of current sense transformer 130, transistor switch 122 and capacitor 120 itself. As long as this current variation is not so large that it causes overheating of capacitor 120, the current variation is not important and its effects can be filtered.

To provide this filtering, capacitor 144 is connected across burden resistor 142 with a size that is selected to provide a time constant that is long compared to the 100 kHz duty cycle switching rate of the PWM controllers 40 and 70. This assures that the voltage developed across resistor 142 and capacitor 144 is an accurate analog representation of the net charging current into the battery 60 during the active portion of the PWM switching cycles.

The secondary voltage of power transformer 62 will also vary at a rate equal to twice the main power line frequency due to the operation of full wave rectifier 20 and boost converter 22. Capacitor 48 must be selected to keep this voltage ripple to an acceptably low value of less than 2% of the DC voltage across capacitor 48. Resistor 146 and capacitor 148 are selected to provide a time constant that is long compared to the period of the 100–120 Hz line frequency fluctuations. The second RC filter, 146, 148, has been found more economical than increasing the size of capacitor 144 enough to filter the line frequency fluctuations. Diode 140 carries the discharge current through the secondary winding of transformer 130 to prevent significant reverse biasing of filter 136 and thus enable the use of polarized capacitors 144 and 148.

If the maximum charging current is to be 1.5 amps, this current will be reflected as a current of 30 ma at the secondary winding of transformer 130. The threshold voltage required to forward bias the base emitter junction of boost converter 22 transistor 68 is 0.6 volts. The threshold voltage will be reached at maximum charge current if resistor 142 is 20 ohms. Resistor 142 and capacitor 144 should have a cut off frequency that is about 1/10 the PWM duty cycle switching frequency, or about 10 kHz. Given the previously selected 20 ohms for resistor 142, a value of 1 μf yields an adequate corner frequency of approximately 8 kHz. Resistor 146 preferably has a value of 1000 ohms while capacitor 148 has a value of 10 μf to provide a corner frequency of 16 Hz.

Voltage feedback circuit 114 detects the voltage at the positive terminal of battery 60 and generates the voltage feedback signal, VBFB, at the open collector of an optically isolated phototransistor 160. The gate of switch 166 is coupled to 12 volts to turn switch 166 off whenever power supply 10 is turned off to prevent the voltage divider 162 from draining the battery 60.

Feedback circuit 114 has an operational amplifier 170 with an internal voltage reference having its inverting input connected to the center of voltage divider 162, its non-inverting input connected to ground via an internal 2.5 volt reference and an open collector output connected through a current limiting resistor 172 to +12 volts and also through a light emitting diode 174 and a Zener diode 176 to ground. Whenever the battery 60 terminal voltage is less than 13.6 volts, the output of operational amplifier 176 goes high, allowing current to flow through light emitting diode 174 to illuminate phototransistor 160, thereby causing feedback signal VBFB to pull down the input to PWM controller 40, which results in an increase of the boost voltage until an equilibrium is reached. Capacitors 180, 182 and in resister 184 tailor the frequency response of operational amplifier 170 so that stability of the feedback loop is assured.

While there has been shown and described a preferred embodiment of a high efficiency uninterruptible power supply with power factor correction and no battery isolation diode in accordance with the invention for the purpose of enabling a person of ordinary skill in the art to make and use the invention, it will be appreciated that the invention is not limited thereto. Accordingly, any modifications, variations or equivalent arrangements within the scope of the accompanying claims should be considered to be within the scope of the invention.

What is claimed is:

1. An electrical power supply comprising:

a rectifying circuit coupled to receive AC power and generate a DC voltage signal in response thereto;

a boost converter coupled to receive the DC voltage signal and a first voltage feedback signal and generate a boost voltage signal in response thereto that is controlled to maintain the first voltage feedback signal at a selected magnitude;

a converter circuit coupled to receive the boost voltage signal as a primary input signal, generate a secondary signal in response to the primary input signal, generate the first voltage feedback signal to represent the voltage of the secondary signal and generate at least one regulated output voltage signal as an output;

an output voltage controller coupled to receive the at least one regulated voltage signal and to control the converter circuit to maintain the at least one regulated output voltage signal at a predetermined voltage; and an auxiliary energy source coupled to supply electrical energy to the converter circuit when the rectifying circuit fails to receive AC power.

2. An electrical power supply according to claim 1, wherein the converter circuit includes a transformer having a primary winding coupled to the boost converter and the output voltage controller and a secondary winding generating the secondary signal, further comprising an auxiliary power switch selectively coupling the auxiliary energy source and the secondary winding through a bidirectionally conductive path, and wherein the boost converter includes a pulse width modulation boost controller controlling the boost voltage in response to a voltage at the auxiliary power supply.

3. An electrical power supply according to claim 2, further comprising an auxiliary current feedback circuit coupled to detect a charging current at the auxiliary power supply and provide a charging current signal indicative thereof, and wherein the boost converter includes a current limiting circuit coupled to receive the charging current signal and reduce the boost voltage when the charging current signal exceeds a selected magnitude.

4. An electrical power supply according to claim 1, wherein the converter circuit includes a power transformer having a primary winding and a secondary winding, the primary winding being coupled to receive the boost voltage signal and the secondary winding being coupled to control generation of the regulated output voltage signal, further comprising a primary power switch coupled in series with the primary winding and the boost voltage signal and an auxiliary power switch coupled in series with the secondary winding and the auxiliary power source and wherein the output voltage controller includes an output pulse width modulation controller coupled to receive the regulated voltage signal and generate an output pulse width modulation control signal, the output pulse width modulation control signal being coupled to simultaneously control the primary power switch and the auxiliary power switch to maintain the regulated output voltage signal at the predetermined voltage.

5. An electrical power supply according to claim 4, further comprising an auxiliary current feedback circuit coupled to sense current flowing between the secondary winding and the auxiliary power supply and generate a current sense discharge current signal in response thereto, and wherein the output voltage controller includes a primary current sense circuit coupled to sense current through the primary winding and generate a primary current signal indicative thereof and a summing circuit coupled to receive the current sense charge current signal and the primary current sense signal and generate an output current feedback signal representing the primary winding current signal less the current sense charge signal, and wherein the output pulse width modulation controller is coupled to receive the output current feedback signal and reduce an active portion of the duty cycle of the pulse width modulation control signal when the output current feedback signal exceeds a selected magnitude.

6. An electrical power supply according to claim 5, further comprising a voltage feedback circuit coupled to detect a voltage at the auxiliary power supply and generate an auxiliary voltage feedback signal in response thereto and wherein the boost converter includes a boost pulse width modulation controller coupled to receive the auxiliary voltage feedback signal and provide pulse width modulation control over the magnitude of the boost voltage signal in response to the auxiliary voltage feedback signal.

7. An electrical power supply according to claim 5, wherein the auxiliary power supply is a 12 volt battery and the boost voltage is controlled to provide a battery float voltage of substantially 13.6 volts at the auxiliary power supply.

8. An electrical power supply according to claim 5, further comprising an auxiliary current sense feedback circuit coupled to detect a charging current at the auxiliary power supply and provide a charging current signal indicative thereof, and wherein the boost converter includes a current limiting circuit coupled to receive the charging current signal and reduce the boost voltage when the charging current signal exceeds a selected magnitude.

9. An electrical power supply according to claim 4, further comprising a current sense transformer having a primary winding coupled in series between the secondary winding of the power transformer and the auxiliary power source and a secondary winding having a first terminal coupled to provide the charging current signal as current feedback signal to the boost converter and a second terminal coupled to provide a current feedback signal to the output voltage controller.

10. An electrical power supply according to claim 9, further comprising first and second current feedback switches couple respectively to the first and second terminals of the secondary winding of the current sense transformer the first and second current feedback switches, the primary power switch and the auxiliary power switch all being synchronously controlled by the output controller.

11. An electrical power supply comprising:
   an electrical power transformer having a primary winding and a secondary winding;
   a boost converter coupled to receive power from a main power supply and a secondary voltage signal that is representative of a voltage at the secondary winding of the power transformer and generate a boost voltage signal controlled to provide a selected peak voltage at the secondary winding of the transformer;
   a voltage feedback circuit coupled to the secondary winding to the power transformer and generating the secondary voltage signal;
   an output filter coupled to filter a power signal received from the secondary transformer winding to generate a regulated output voltage signal having a regulated voltage;
   a primary power switch coupled in series with the primary winding; and
   an output voltage controller coupled to generate an output pulse width modulation control signal, the output pulse width modulation control signal being coupled to control the primary power switch to control a flow of current from the boost voltage signal through the transformer primary winding with an active duty cycle portion selected to maintain the output signal at the regulated voltage.

12. An electrical power supply according to claim 11, an auxiliary power source and an auxiliary power switch coupling the auxiliary power source to the secondary with no current blocking component between the auxiliary power source and the secondary winding other than the auxiliary power switch, the auxiliary power switch being coupled to switch synchronously with the primary power switch at all times that the power supply is in operation.

13. An electrical power supply according to claim 12, further comprising:
   means for sensing current flow between the auxiliary power supply and the secondary winding and generating a first feedback signal indicating a charging current and a second feedback signal indicating a discharging current;
   the boost converter including means responsive to the first feedback signal for reducing the boost voltage signal when the first feedback signal exceeds a first threshold magnitude; and
   the output voltage controller including means responsive to the second feedback signal for reducing the regulated output voltage signal when the second feedback signal exceeds a second threshold magnitude.

14. An electrical power supply providing a continuous, seamless transition between operation in response to a main power source and operation in response to an auxiliary power supply having an output voltage, the power supply comprising:
   at a rectifier coupled to generate a DC voltage signal in response to the main power supply;
   at a power transformer having a primary winding and a secondary winding;
   a primary power switch coupled in series with the primary winding and the DC voltage signal;
   an auxiliary power switch coupled for series connection between the secondary winding and the auxiliary power supply to form a bidirectionally conductive path between the auxiliary power supply and the secondary winding when the switch is closed an the auxiliary power supply is installed;
   a filter coupled to generate an output voltage signal in response to the secondary winding; and
   an output voltage controller coupled to receive an indication of the output voltage signal and generate an output pulse width modulation control signal having an active duty cycle portion that is controlled to maintain the output voltage signal at a selected magnitude, the output pulse width modulation control signal being coupled to control both the auxiliary power switch and the primary power switch.

15. An electrical power supply according to claim 14, further comprising a boost converter coupled between the DC voltage signal and the primary winding, the boost converter receiving and auxiliary voltage feedback signal that is indicative of a voltage at the auxiliary power supply and boosting the DC voltage signal to form a boost voltage signal that is controlled to maintain the voltage at the auxiliary power supply at a predetermined magnitude.

16. A process of generating regulated DC voltage signal comprising:
   generating an intermediate electrical signal having a voltage controlled to match a voltage of an auxiliary electrical power source;
   coupling an auxiliary power source to the intermediate electrical signal;
   filtering the intermediate electrical signal to generate an output signal; and
   pulse width modulating the intermediate electrical signal to regulate the voltage of the output signal.

17. A process of generating a regulated DC voltage signal according to claim 16, further comprising reducing the voltage of the intermediate electrical signal when current flow between the intermediate electrical signal and the auxiliary power source exceeds a selected magnitude.

18. A process of generating a regulated DC voltage signal according to claim 16, further comprising reducing the voltage of the output signal when current flow between the intermediate electrical signal and the auxiliary power source exceeds a selected magnitude.

19. A process of generating a regulated DC voltage signal comprising:

rectifying an AC power signal to generate a DC voltage signal;

boosting the DC voltage signal to a voltage that is controlled to provide an intermediate voltage signal at a selected magnitude;

coupling an auxiliary power source to the intermediate voltage signal through a conductive path that permits a bidirectional flow of current between the auxiliary power source and the intermediate voltage signal; and pulse width modulating the intermediate voltage signal with an active cycle portion that is controlled to maintain the output signal at a predetermined voltage.

20. A process of generating a regulated DC voltage signal according to claim 19, further comprising synchronously switching current from the boosted DC voltage signal and the auxiliary power source to pulse width modulate the intermediate voltage signal.

* * * * *